(12) United States Patent
Kaneta et al.

(10) Patent No.: US 9,804,641 B2
(45) Date of Patent: Oct. 31, 2017

(54) PROGRAMMABLE CONTROLLER

(71) Applicant: JTEKT CORPORATION, Osaka-shi (JP)

(72) Inventors: Tomohisa Kaneta, Kariya (JP); Yasunori Tsuboi, Toyota (JP); Hidetoshi Kato, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/278,278

(22) Filed: Sep. 28, 2016

(65) Prior Publication Data
US 2017/0097664 A1 Apr. 6, 2017

(30) Foreign Application Priority Data

Oct. 2, 2015 (JP) .................................. 2015-197026

(51) Int. Cl.
*H05K 5/00* (2006.01)
*G06F 1/18* (2006.01)
*G05B 19/05* (2006.01)

(52) U.S. Cl.
CPC .............. *G06F 1/183* (2013.01); *G05B 19/05* (2013.01); *G06F 1/189* (2013.01); *G05B 2219/14007* (2013.01)

(58) Field of Classification Search
CPC ......... G06F 1/183; G06F 1/189; G05B 10/05; G05B 2219/14007

USPC ......................................................... 361/731
See application file for complete search history.

(56) References Cited

U.S. PATENT DOCUMENTS

| | | | | |
|---|---|---|---|---|
| 4,790,762 A | * | 12/1988 | Harms | H05K 7/1478 439/59 |
| 6,456,495 B1 | * | 9/2002 | Wieloch | H05K 7/1468 312/215 |
| 8,986,033 B2 | * | 3/2015 | Berger | H05K 7/1468 439/341 |
| 2003/0005196 A1 | * | 1/2003 | Reed | G05B 19/05 710/300 |
| 2014/0194007 A1 | * | 7/2014 | Cech | H01R 9/2675 439/631 |

FOREIGN PATENT DOCUMENTS

JP 2002-62908 2/2002

* cited by examiner

*Primary Examiner* — Hung S Bui
(74) *Attorney, Agent, or Firm* — Oblon, McClelland, Maier & Neustadt, L.L.P.

(57) ABSTRACT

A programmable controller includes forward switching units and backward switching units. The forward switching units electrically disconnect forward communication wirings if a module is mounted on a slot connector, and electrically short-circuits the forward communication wirings if no module is mounted on the slot connector. The backward switching units electrically disconnect backward communication wirings if the module is mounted on the slot connector, and electrically short-circuits the backward communication wirings if no module is mounted on the slot connector.

4 Claims, 12 Drawing Sheets

PROGRAMMABLE CONTROLLER

INCORPORATION BY REFERENCE

The disclosure of Japanese Patent Application No. 2015-197026 filed on Oct. 2, 2015 including the specification, drawings, and abstract is incorporated herein by reference in its entirety.

BACKGROUND OF THE INVENTION

1. Field of the Invention

The present invention relates to programmable controllers that include a base unit having a plurality of slots, or spaces where modules are to be mounted, arranged from a first end to a second end, and the modules mounted in the slots.

2. Description of the Related Art

Programmable controllers are what is called programmable logic controllers (PLCs), or control devices that sequentially perform the steps of control in predetermined order or according to predetermined procedures. For example, a safety door is installed around a machine tool that machines workpieces. The safety door is installed to separate the operator from the machine tool to ensure operator's safety. A machining start button for starting machining of the machine tool may be provided at a position slightly away from the safety door, and an emergency stop button may be provided next to the machining start button. The safety door may be provided with a limit switch that detects if the safety door is open or closed. The machine tool may be provided with a predetermined sensor that detects completion of machining.

In this case, signals from the limit switch, the machining start button, the emergency stop button, and the predetermined sensor are input to the programmable controller, and an operation start control signal that starts operation of the machine tool and an operation stop control signal that stops operation of the machine tool are output from the programmable controller. The programmable controller proceeds with the steps of control (e.g., starts operation of the machine tool, and stops operation of the machine tool if it detects completion of machining) only when it detects predetermined order (e.g., if it detects that the machining start button is turned on after the safety door is closed). For example, if the machine tool is in operation when the programmable controller detects depression of the emergency stop button or opening of the safety door, the programmable controller stops operation of the machine tool.

For example, the programmable controllers are installed for various machine tools at various factories, and each program controller has a different configuration depending on the type of machine tool, the types of buttons around the machine tool, the type of safety door, the order, etc. For example, a conventional programmable controller 101 shown in FIG. 15 is formed by a base unit 110 and various modules. The base unit 110 has a plurality of slots, or spaces where modules are to be mounted, and the slots are arranged from a first end to a second end of the base unit 110. The various modules are detachably mounted in the slots of the base unit 110. There are various types of modules such as a power supply module 121, a central processing unit (CPU) module 122, a communication module 124, an input module 125, and an output module 126.

For example, in FIG. 15, the power supply module 121 is a module that supplies electric power to each module mounted on the base unit 110, the communication module 124 is a module that communicates with other device(s) by using, e.g., a local area network (LAN), the input module 125 is a module to which input signals from various buttons, switches, etc. are input, and the output module 126 is a module that outputs various control signals. The CPU module 122 determines prescribed order etc. according to a received signal from the input module 125 in accordance with an installed program, and outputs a control signal via the output module 126. The required modules are selected in accordance with the environment in which the programmable controller 101 is to be used, and the selected modules are detachably mounted in the slots of the base unit 110. The prescribed order and the steps of control to be performed in the case where this order is detected are programmed, and the program thus obtained is installed in the CPU module 122.

In FIG. 15, the base unit 110 has, for each slot, a wiring that supplies electric power from the power supply module 121 to each module, and a wiring for communication between the modules, and a slot connector that is fitted in a module connector of the module. The modules are detachably mounted in the slots of the base unit 110 by fitting the module connectors on the slot connectors.

In typical programmable controllers, the power supply module is mounted in the slot at the first end of the base unit, the CPU module is mounted in the slot on the second end side which adjoins the power supply module, and the communication module, the input module, and the output module are mounted in the slots on the second end side which adjoins the CPU module so that there is no empty slot between the modules. Conventionally, adjoining ones of the modules mounted in a region on the second end side with respect to the CPU module (corresponding to the communication region) and including the CPU module transmit and receive information to and from each other.

As shown in FIG. 15, in the conventional programmable controller 101, the power supply module 121 is mounted in the slot at the first end, and the CPU module 122 is mounted at the first end in the communication region 120. The communication module 124, the input module 125, the output module 126, etc. are mounted in the communication region 120 in the direction from the CPU module 122 toward the second end (in this case, the Y-axis direction) so that there is no empty slot between the modules. The programmable controller 101 performs forward communication and backward communication in the communication region 120. The forward communication is communication that is performed to sequentially transmit information from the first end side (in this case, the CPU module 122) to the second end side (in this case, the output module 126) in the communication region 120. The backward communication is communication that is performed to sequentially transmit the information from the second end side (in this case, the output module 126) to the first end side (in this case, the CPU module 122) in the communication region 120.

In the conventional programmable controller 101 shown in FIG. 15, communication [1-1], communication [1-2], and communication [1-3] correspond to the forward communication. The communication [1-1] is communication that is performed to transmit the information from the CPU module 122 to the communication module 124. The communication [1-2] is communication that is performed to transmit the information from the communication module 124 to the input module 125. The communication [1-3] is communication that is performed to transmit the information from the input module 125 to the output module 126. In the conventional programmable controller 101 shown in FIG. 15, communication [2-1], communication [2-2], and communication [2-3] correspond to the backward communication. The communication [2-1] is communication that is performed to transmit the information from the output module 126 to the input module 125. The communication [2-2] is communication that is performed to transmit the information from the input module 125 to the communication module 124. The communication [2-3] is communication that is performed to transmit the information from the communication module 124 to the CPU module 122.

Conventionally, for example, if there is an empty slot between the input module 125 and the output module 126 in the communication region 120 as shown in FIG. 16, the forward communication is completed by the communication [1-1] performed to transmit information from the CPU module 122 to the communication module 124 and the communication [1-2] performed to transmit information from the communication module 124 to the input module 125, and forward communication from the input module 125 to the output module 126 is not performed (since the input module 125 has no module to communicate with in the communication [1-3]). Moreover, the backward communication is completed by the communication [2-1] performed to transmit information from the input module 125 to the communication module 124 and the communication [2-2] performed to transmit information from the communication module 124 to the CPU module 122, and backward communication from the output module 126 to the input module 125 is not performed. Conventionally, it is therefore necessary to mount the modules in the communication region 120 from the first end side (in this case, the left side) with no empty slot between the modules, as shown in the example of FIG. 15.

For example, Japanese Patent Application Publication No. 2002-62908 (JP 2002-62908 A) discloses a programmable controller in which modules are mounted in a plurality of slots of a mother board and which transmits data between the modules by using a ring bus system. In this programmable controller, a bypass mechanism that bypasses the ring bus is provided in a predetermined number of connectors on the mother board (corresponding to the base unit). In an empty slot, the ring bus is bypassed by the bypass mechanism so that communication with the module next to the empty slot can be performed by using the ring bus system.

In the programmable controller described in JP 2002-62908 A, the modules are connected in order by an annular ring bus. For example, if communication is started by the master module, information is sequentially transmitted from the master module to the adjoining module connected to the annular ring bus. After the information is transmitted to the last module, the information is transmitted from the last module to the master module (since the modules are connected in order by the annular ring bus). Accordingly, the information is transmitted in one direction, and this programmable controller cannot be applied as it is to the communication having forward communication and backward communication.

SUMMARY OF THE INVENTION

It is one object of the present invention to provide a programmable controller that performs forward communication and backward communication and that can perform the forward communication and the backward communication between modules even if there is an empty slot between adjoining ones of the modules.

According to one aspect of the present invention, a programmable controller includes: a base unit having a plurality of slots, or spaces where modules are to be mounted, arranged from a first end to a second end; and the modules mounted in the slots. A slot connector that fits in a module connector of the module is provided in each of the slots, and the module is mounted in the slot by fitting the module connector on the slot connector. The modules include a master module that includes a function to start communication from the master module to another one of the modules at predetermined timing, and a slave module that includes a function to receive information through communication and perform communication to another one of the modules. The master module is mounted in one or more of the slots including the slot closest to the first end in a communication region, or a region including a plurality of the slots where the modules that perform the communication are to be mounted. The slave module is mounted in at least one of a plurality of the slots which are located closer to the second end than the one or more slots where the master module is mounted in the communication region.

The communication includes forward communication that is started by the master module and that is performed so that the information is sequentially transmitted from the module on a first end side to the module on a second end side, and backward communication that is started by a second end module, or the slave module mounted closest to the second end, after the second end module receives the information in the forward communication, and that is performed so that the information is sequentially transmitted from the second end module to the master module. When the slave module mounted closest to the second end attempts to transmit the information received from the module on the first end side in the forward communication to the module on the second end side in the forward communication, this slave module detects that there is no module mounted on the second end side of this slave module, and recognizes that this slave module itself is the second end module. The base unit has forward communication wirings each connecting the slot connector on the first end side to the slot connector on the second end side out of the slot connectors adjoining each other in the communication region and performing the forward communication, and backward communication wirings each connecting the slot connector on the second end side to the slot connector on the first end side out of the slot connectors adjoining each other in the communication region and performing the backward communication. A forward switching unit and a backward switching unit are disposed near each of the slot connectors of intermediate slots, or the slots in the communication region excluding the one or more slots where the master module is mounted and the slot at the second end. The forward switching unit electrically disconnects the forward communication wiring on the first end side from the forward communication wiring on the second end side when the module is mounted in the slot, and electrically short-circuits the forward communication wiring on the first end side to the forward communication wiring on the second end side when the module is not mounted in the slot. The backward switching unit electrically disconnects the backward communication wiring on the second end side from the backward communication wiring on the first end side when the module is mounted in the slot, and electrically short-circuits the backward communication wiring on the second end side to the backward communication wiring on the first end side when the module is not mounted in the slot.

According to the above aspect, the programmable controller that performs the forward communication and the backward communication includes the forward switching units and the backward switching units. Each of the forward switching units bypasses the forward communication by short-circuiting the forward communication wiring on the first end side to the forward communication wiring on the second end side, if the module is not mounted on the slot connector corresponding to that forward switching unit. Each of the backward switching units bypasses the backward communication by short-circuiting the backward communication wiring on the second end side to the backward communication wiring on the first end side, if the module is not mounted on the slot connector corresponding to that backward switching unit. The programmable controller can thus perform the forward communication and the backward communication between the modules even if there is an empty slot between adjoining ones of the modules.

In the programmable controller of the above aspect, each of the slot connectors of the intermediate slots may have a plurality of pins and may have a forward receiving pin that is used for communication with the nearest module mounted on the first end side of that slot connector in the forward communication, a forward transmitting pin that is used for communication with the nearest module mounted on the second end side of that slot connector in the forward communication, a backward receiving pin that is used for communication with the nearest module mounted on the second end side of that slot connector in the backward communication, and a backward transmitting pin that is used for communication with the nearest module mounted on the first end side of that slot connector in the backward communication.

The slot connector of the slot located closest to the second end out of the slots where the master module is mounted in the communication region may have a plurality of pins and may have the forward transmitting pin and the backward receiving pin. The slot connector of the slot at the second end in the communication region may have a plurality of pins and may have the forward receiving pin and the backward transmitting pin. The forward communication wiring on the first end side may be connected to the forward receiving pin, the forward communication wiring on the second end side may be connected to the forward transmitting pin, the backward communication wiring on the second end side may be connected to the backward receiving pin, and the backward communication wiring on the first end side may be connected to the backward transmitting pin. The forward switching unit may be connected to the forward receiving pin and the forward transmitting pin. The forward switching unit may electrically disconnect the forward receiving pin from the forward transmitting pin if the module is mounted in the slot, and may electrically short-circuit the forward receiving pin to the forward transmitting pin if the module is not mounted in the slot. The backward switching unit may be connected to the backward receiving pin and the backward transmitting pin. The backward switching unit may electrically disconnect the backward receiving pin from the backward transmitting pin if the module is mounted in the slot, and may electrically short-circuit the backward receiving pin to the backward transmitting pin if the module is not mounted in the slot.

According to the above aspect, the forward switching unit bypasses the forward communication by short-circuiting the forward receiving pin to the forward transmitting pin, if the module is not mounted in the slot corresponding to this forward switching unit. The backward switching unit bypasses the backward communication by short-circuiting the backward receiving pin to the backward transmitting pin, if the module is not mounted in the slot corresponding to this backward switching unit. The programmable controller can thus perform the forward communication and the backward communication between the modules even if there is an empty slot between adjoining ones of the modules.

In the programmable controller of the above aspect, the forward switching unit may be a forward switch circuit that can switch between an open state and a short-circuited state, and the backward switching unit may be a backward switch circuit that can switch between an open state and a short-circuited state. Electric power may be supplied from the base unit to the forward switch circuit and the backward switch circuit. If the module is mounted in the slot corresponding to the forward switch circuit and the backward switch circuit, a switch signal may be applied from this module to the forward switch circuit and the backward switch circuit. If the module is not mounted in the slot corresponding to the forward switch circuit and the backward switch circuit, the switch signal may not be applied to the forward switch circuit and the backward switch circuit. The forward switch circuit and the backward switch circuit may electrically disconnect intended ones of the wirings or the pins from each other if the switch signal is applied thereto. The forward switch circuit and the backward switch circuit may electrically short-circuit the intended ones of the wirings or the pins to each other if the switch signal is not applied thereto.

According to the above aspect, the forward switching units and the backward switching units can be specifically and appropriately implemented.

In the programmable controller of the above aspect, the forward switch circuits, the backward switch circuits, and the slot connectors may be mounted on a printed circuit board disposed on the base unit. Each of the forward communication wirings and the backward communication wirings may be linearly disposed on the printed circuit board. Each of the forward switch circuits may be mounted on an opposite surface of the printed circuit board from the slot connector so as to be located between the forward communication wiring on the first end side and the forward communication wiring on the second end side. Each of the backward switch circuits may be mounted on the opposite surface of the printed circuit board from the slot connector so as to be located between the backward communication wiring on the second end side and the backward communication wiring on the first end side.

According to the above aspect, a communication path of the forward communication and a communication path of the backward communication can be made linear and substantially equal in length. In the case where the communication wiring is bent or the communication wirings disposed side by side have different lengths, signal reflection tends to occur, which tends to cause noise. In the programmable controller of the above aspect, however, the switch circuits that can cause bending of the communication wirings are disposed on the opposite surface of the printed circuit board. This makes it easy to form the linear communication wirings. The communication is therefore less likely to be subjected to noise, and more reliable forward communication and backward communication can be achieved. This is particularly effective in performing relatively high speed communication.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
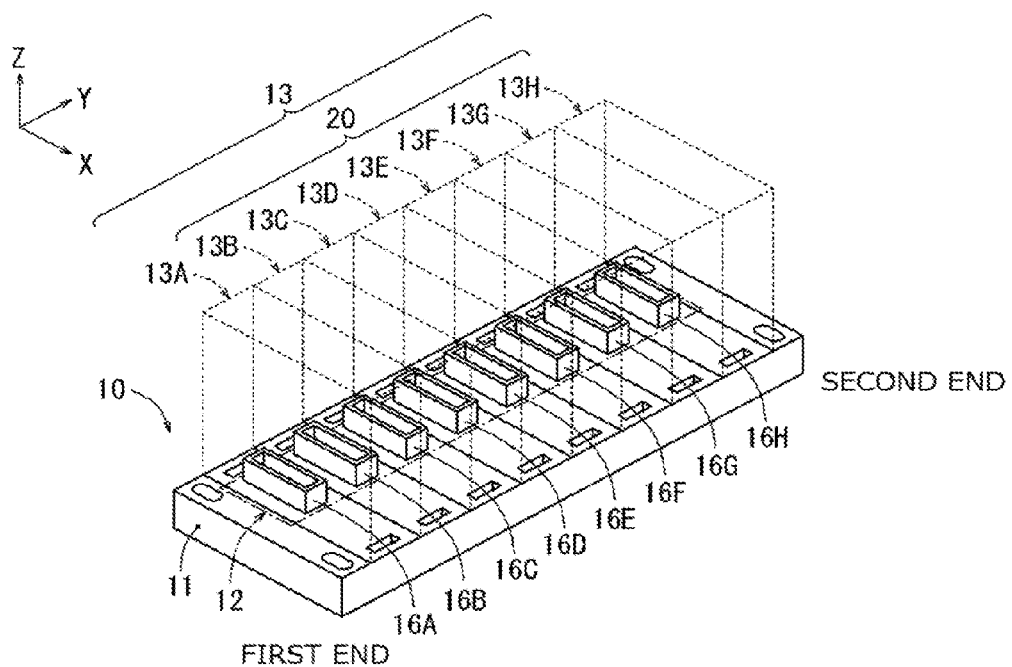
FIG. 1 is a perspective view illustrating an example of the structure and appearance of a base unit.

An embodiment of the present invention will be described below with reference to the accompanying drawings. In the drawings showing X-, Y-, and Z-axes, the X-, Y-, and Z-axes are perpendicular to each other. The Z-axis direction is the upward vertical direction, the Y-axis direction is the longitudinal direction (direction from a first end toward a second end) of a base unit 10, and the X-axis direction is the direction toward the front surface of the base unit 10.

Figure 2:
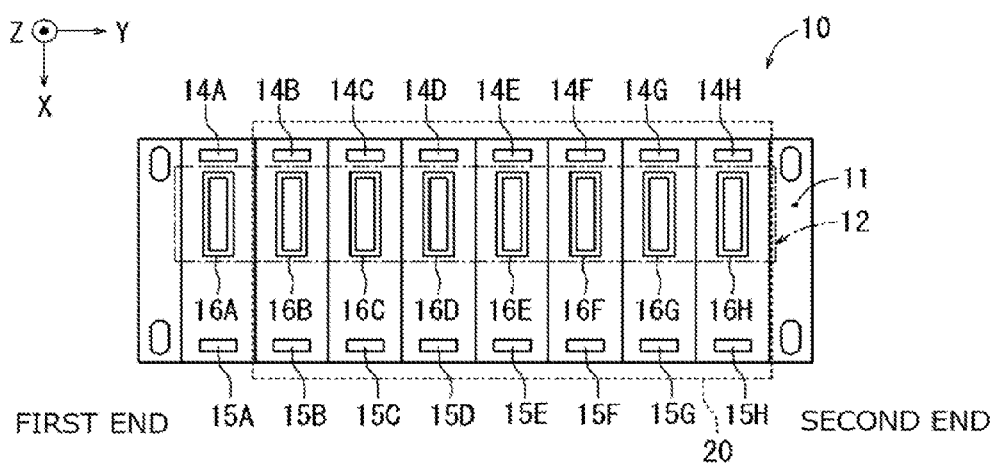
FIG. 2 is a plan view illustrating the example of the structure and appearance of the base unit.

As shown in FIGS. 1 and 2, the base unit 10 includes a base 11, a printed circuit board 12, slot connectors 16A to 16H, etc. The base 11 is formed in the shape of a plate by using an insulator such as a resin. The printed circuit board 12 has the slot connectors 16A to 16H mounted thereon, and the base 11 has the printed circuit board 12 disposed thereon with the slot connectors 16A to 16H facing upward. The base unit 10 has a plurality of slots 13A to 13H, or spaces where modules described below are to be mounted. The slots 13A to 13H are arranged from a first end (in this example, the left end in FIG. 2) to a second end (in this example, the right end in FIG. 2) of the base unit 10. The slot connectors 16A to 16H are disposed in the slots 13A to 13H, respectively. The slot connectors 16A to 16H fit in module connectors (22C etc., see FIG. 4) of the modules.

Figure 4:
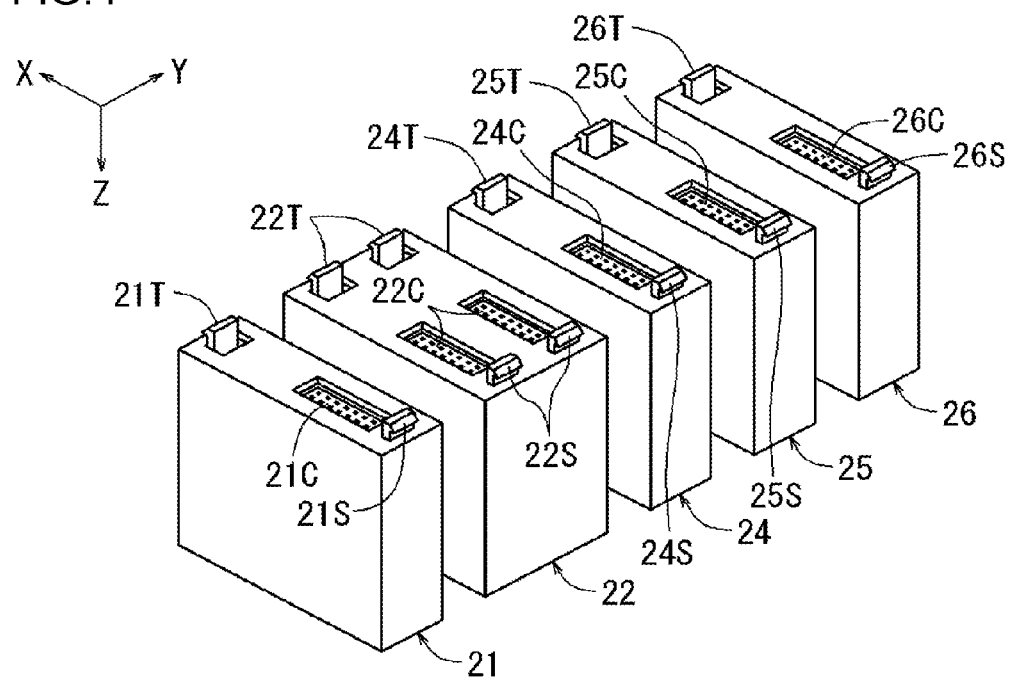
FIG. 4 is a perspective view illustrating an example of the appearance of the back side of each module in FIG. 3.

The base 11 has first attachment holes 14A to 14H and second attachment holes 15A to 15H for the slots 13A to 13H, respectively, in order to help support the modules detachably mounted in the slots 13A to 13H of the base unit 10. For example, an input module 25 shown in FIG. 4 is mounted in the slot 13D by fitting a module connector 25C of the input module 25 on the slot connector 16D of the slot 13D. A first stopper claw 25S of the input module 25 is caught by the first attachment hole 14D and fixed therein, and a second stopper claw 25T of the input module 25 is caught by the second attachment hole 15D and fixed therein.

For example, the slot 13A, or the slot at the first end, is prepared as a dedicated slot for a power supply module 21 (see FIG. 2). A communication region 20 including the slots 13B to 13H, or the slots except the slot 13A at the first end, is a region including a plurality of slots where the modules that communicate with each other are to be mounted. A CPU module 22 (corresponding to the master module) described below is mounted in the slots 13B, 13C in the communication region 20, namely the slots including the slot 13B at the first end in the communication region 20. A slave module described below is mounted in at least one of the slots 13D to 13H, namely at least one of the slots located closer to the second end than the slots 13B, 13C where the CPU module 22 is mounted in the communication region 20. The present embodiment is described with respect to an example in which the CPU module 22 occupies two slots.

Figure 3:
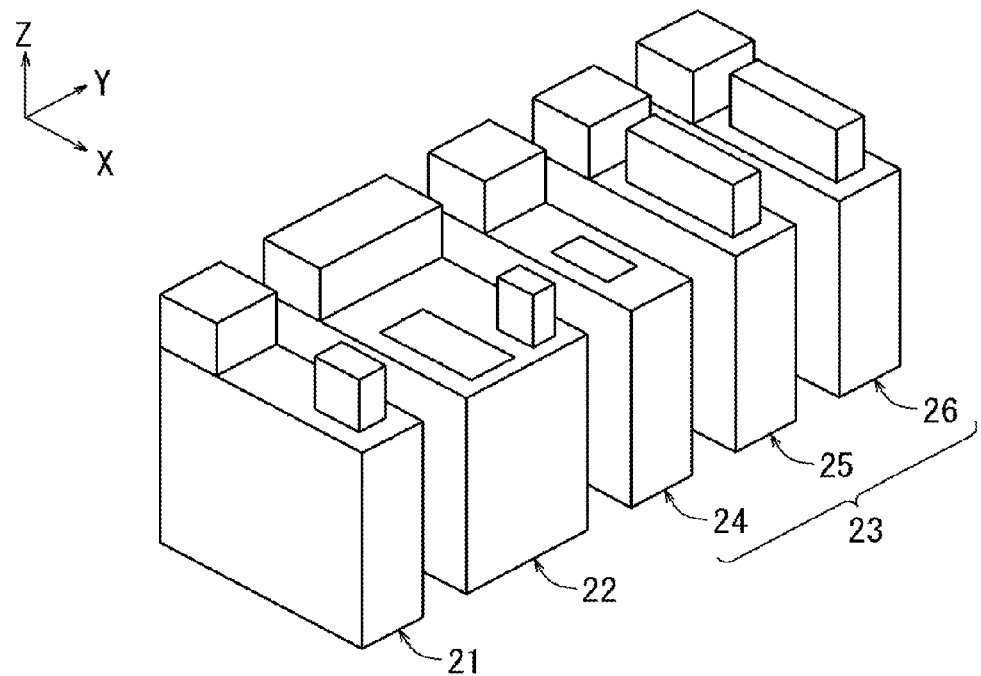
FIG. 3 is a perspective view illustrating an example of types of modules and an example of the appearance of each module.

As shown in FIGS. 3 and 4, the modules include the power supply module 21, the master module (the CPU module 22), and slave modules 23 (a communication module 24, the input module 25, an output module 26, etc.). A plurality of types of modules are prepared according to the functions.

The power supply module 21 is a module that is always mounted on the base unit 10. The power supply module 21 is mounted in the slot 13A at the first end of the base unit 10 shown in FIG. 1. As the appearance of the power supply module 21 is shown in FIGS. 3 and 4, the size of the power supply module 21 corresponds to that of a single slot, and the power supply module 21 has a module connector 21C, a first stopper claw 21S, and a second stopper claw 21T. The power supply module 21 is a module that supplies electric power to each module mounted on the base unit 10 via the module connector 21C. The power supply module 21 is a special module that is neither a master module nor a slave module.

The CPU module 22 is a module that is always mounted on the base unit 10. The CPU module 22 is mounted in one or more slots including the slot 13B closest to the first end in the communication region 20 shown in FIG. 1. The CPU module 22 of the present embodiment is large enough to occupy two slots. The CPU module 22 is therefore mounted in the slots 13B, 13C. As shown in FIGS. 3 and 4, as the appearance of the CPU module 22 is shown in FIGS. 3 and 4, the size of the CPU module 22 corresponds to that of two slots, and the CPU module 22 has two module connectors 22C, two first stopper claws 22S, and two second stopper claws 22T. For example, the CPU module 22 is a module that communicates with other device(s) via a local area network (LAN) through the communication module 24 mounted on the base unit 10, obtains various input signals through the input module 25 mounted on the base unit 10 to determine prescribed order etc., and outputs control signals through the output module 26 mounted on the base unit 10. The CPU module 22 corresponds to the master module. The master module is a module that includes a function to start communication to transmit information to other module(s) (module(s) mounted in the communication region 20) at predetermined timing.

The communication module 24 is mounted in one of the slots located closer to the second end than the slots where the master module is mounted in the communication region 20 shown in FIG. 1. The communication module 24 is not an essential module but a module that is mounted on the base unit 10 if the operator determines that the communication module 24 is necessary. As the appearance of the communication module 24 is shown in FIGS. 3 and 4, the size of the communication module 24 corresponds to that of a single slot, and the communication module 24 has a module connector 24C, a first stopper claw 24S, and a second stopper claw 24T. For example, the communication module 24 is a module to which a LAN cable is connected and which communicates with other device(s) connected to the LAN (e.g., Ethernet (registered trademark) communication). The communication module 24 corresponds to the slave module. The slave module is a module that includes a function to perform communication to transmit information, received from the master module or other slave module(s) through communication, to other slave modules(s) or the master module.

The input module 25 is mounted in one of the slots located closer to the second end than the slots where the master module is mounted in the communication region 20 shown in FIG. 1. The input module 25 is not an essential module but a module that is mounted on the base unit 10 if the operator determines that the input module 25 is necessary. As the appearance of the input module 25 is shown in FIGS. 3 and 4, the size of the input module 25 corresponds to that of a single slot, and the input module 25 has the module connector 25C, the first stopper claw 25S, and the second stopper claw 25T. For example, the input module 25 is a module that is connected to various buttons, switches, etc. and receives various input signals and transmits the input signals to the CPU module 22. The input module 25 corresponds to the slave module.

The output module 26 is mounted in one of the slots located closer to the second end than the slots where the master module is mounted in the communication region 20 shown in FIG. 1. The output module 26 is not an essential module but a module that is mounted on the base unit 10 if the operator determines that the output module 26 is necessary. As the appearance of the output module 26 is shown in FIGS. 3 and 4, the size of the output module 26 corresponds to that of a single slot, and the output module 26 has a module connector 26C, a first stopper claw 26S, and a second stopper claw 26T. For example, the output module 26 is a module that outputs various control signals from the CPU module 22. The output module 26 corresponds to the slave module.

The slave module is mounted in at least one of the slots (in the example of FIG. 1, the slots 13D to 13H) located closer to the second end than the slots where the master module is mounted in the communication region 20 shown in FIG. 1. That is, at least one of the slave modules is selected, and the selected slave module is mounted in one of the slots located closer to the second end than the slots where the master module is mounted in the communication region 20. The power supply module 21 and the CPU module 22 (master module) are essential modules and are mounted in the slots described above.

Figure 5:
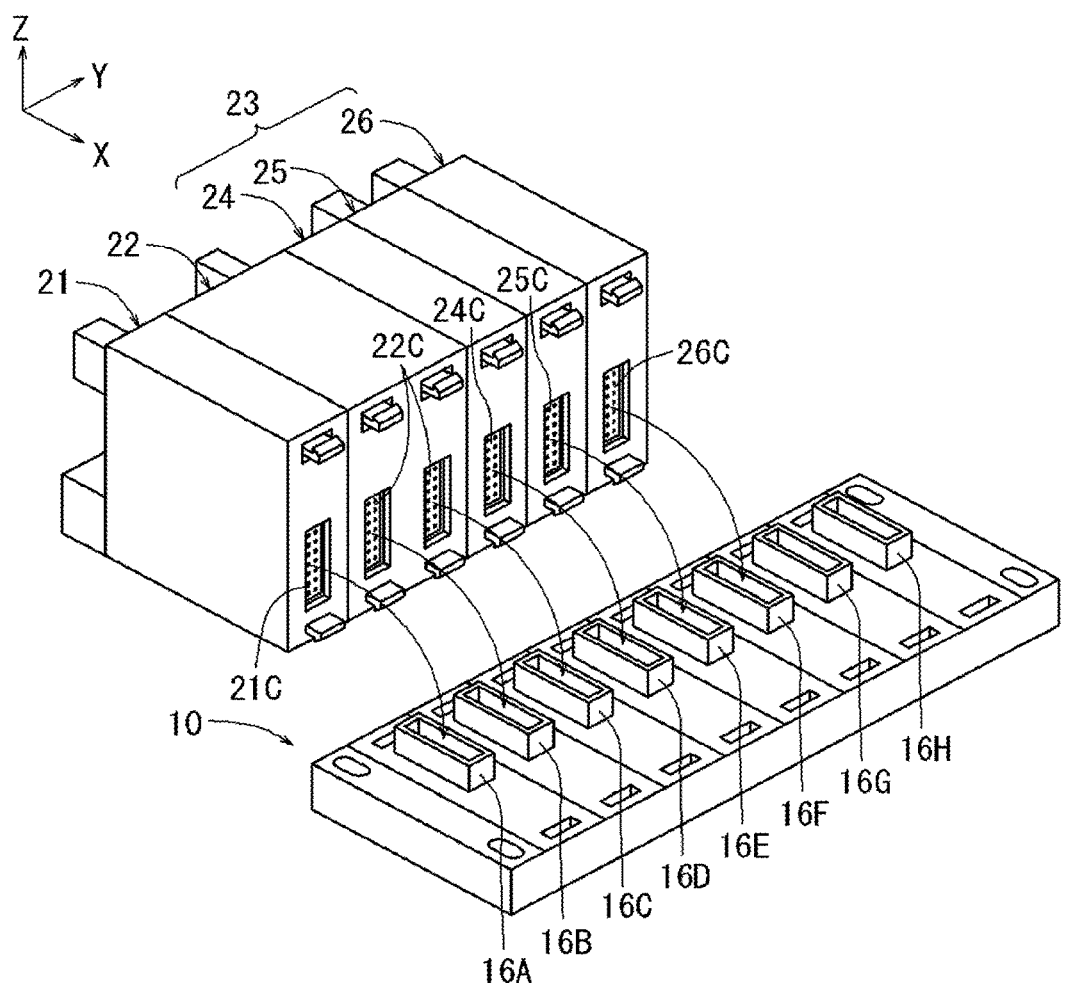
FIG. 5 is a perspective view illustrating how a power supply module, a CPU module, a communication module, an input module, and an output module are mounted on the base unit.

FIG. 5 shows an example of how the power supply module 21 is mounted in the slot 13A (see FIG. 1) by fitting the slot connector 16A in the module connector 21C, how the CPU module 22 is mounted in the slots 13B, 13C (see FIG. 1) by fitting the slot connectors 16B, 16C in the module connectors 22C, how the communication module 24 is mounted in the slot 13D (see FIG. 1) by fitting the slot connector 16D in the module connector 24C, how the input module 25 is mounted in the slot 13E (see FIG. 1) by fitting the slot connector 16E in the module connector 25C, and how the output module 26 is mounted in the slot 13F (see FIG. 1) by fitting the slot connector 16F in the module connector 26C.

Communication that is performed by the master module and the slave modules includes two types of communication: forward communication and backward communication. For example, EtherCAT communication corresponds to this communication. The forward communication is communication that is started by the master module (CPU module 22) mounted in the communication region 20 and that is performed so that information is sequentially transmitted from the module on the first end side to the module on the second end side in the communication region 20. In examples of FIGS. 11 and 12, the forward communication is communication that is performed so that information is sequentially transmitted from the module on the first end side to the module on the second end side in communication [1-1], or the start of the forward communication, communication [1-2], and communication [1-3].

Figure 11:
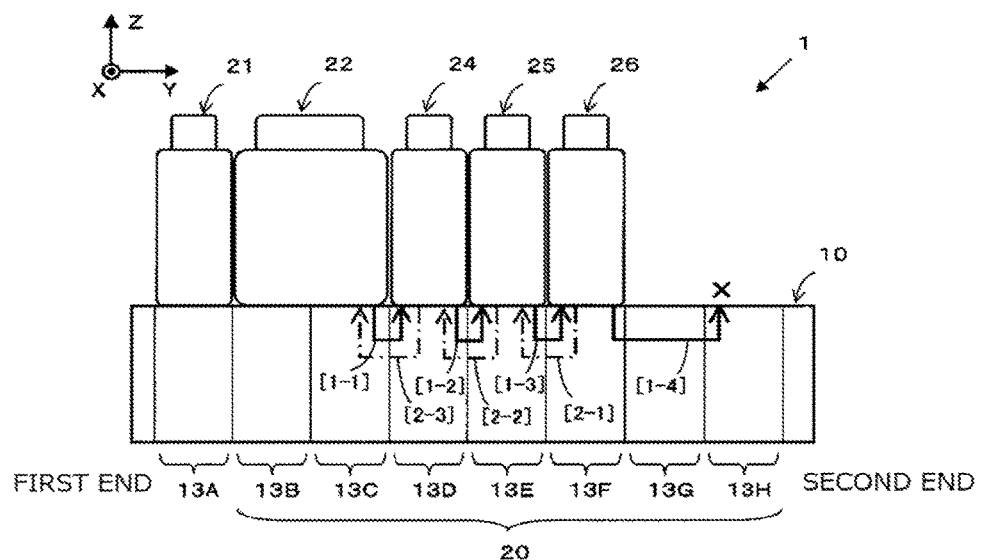
FIG. 11 is a diagram illustrating an example of forward communication and backward communication in the case where a group of mounted communication modules is formed so that there is no empty slot between adjoining ones of the modules in a programmable controller of an embodiment of the present invention.
Figure 12:
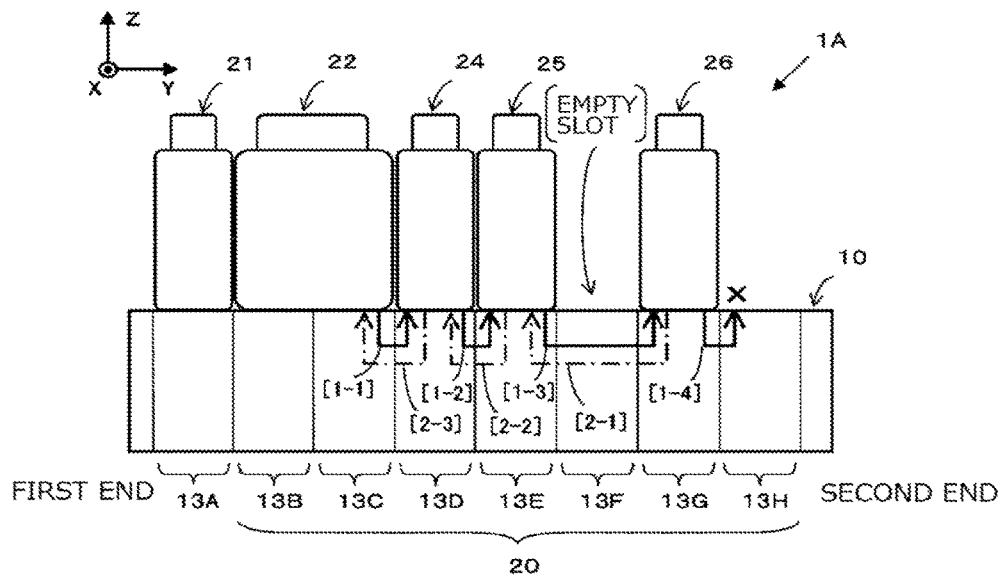
FIG. 12 is a diagram illustrating an example of forward communication and backward communication in the case where a group of mounted communication modules is formed so that there is an empty slot between adjoining ones of the modules in the programmable controller of the embodiment of the present invention.

The backward communication is communication that is started by the second end module, or the slave module mounted closest to the second end in the communication region 20, after the second end module receives the information in the forward communication, and that is performed so that the information is sequentially transmitted from the module on the second end side to the module on the first end side in the communication region 20. In the examples of FIGS. 11 and 12, the backward communication is communication that is performed so that information is sequentially transmitted from the module on the second end side to the module on the first end side in communication [2-1], or the start of the backward communication, communication [2-2], and communication [2-3]. In the examples of FIGS. 11 and 12, the slave module mounted closest to the second end in the communication region 20 (in this case, the output module 26) attempts to transmit the information, received from the module on the first end side (in this case, the input module 25) in the communication [1-3] of the forward communication, to the module on the second end side in the forward communication (in this case, communication [1-4]). This slave module detects that there is no response in the attempted forward communication (in this case, [1-4] communication) and thus detects that there is no module mounted on the second end side of this slave module. This slave module thus recognizes that this slave module itself is the second end module. The second end module performs the communication [2-1], or the start of the backward communication. A method for detecting the second end module will be described in detail later.

Figure 6:
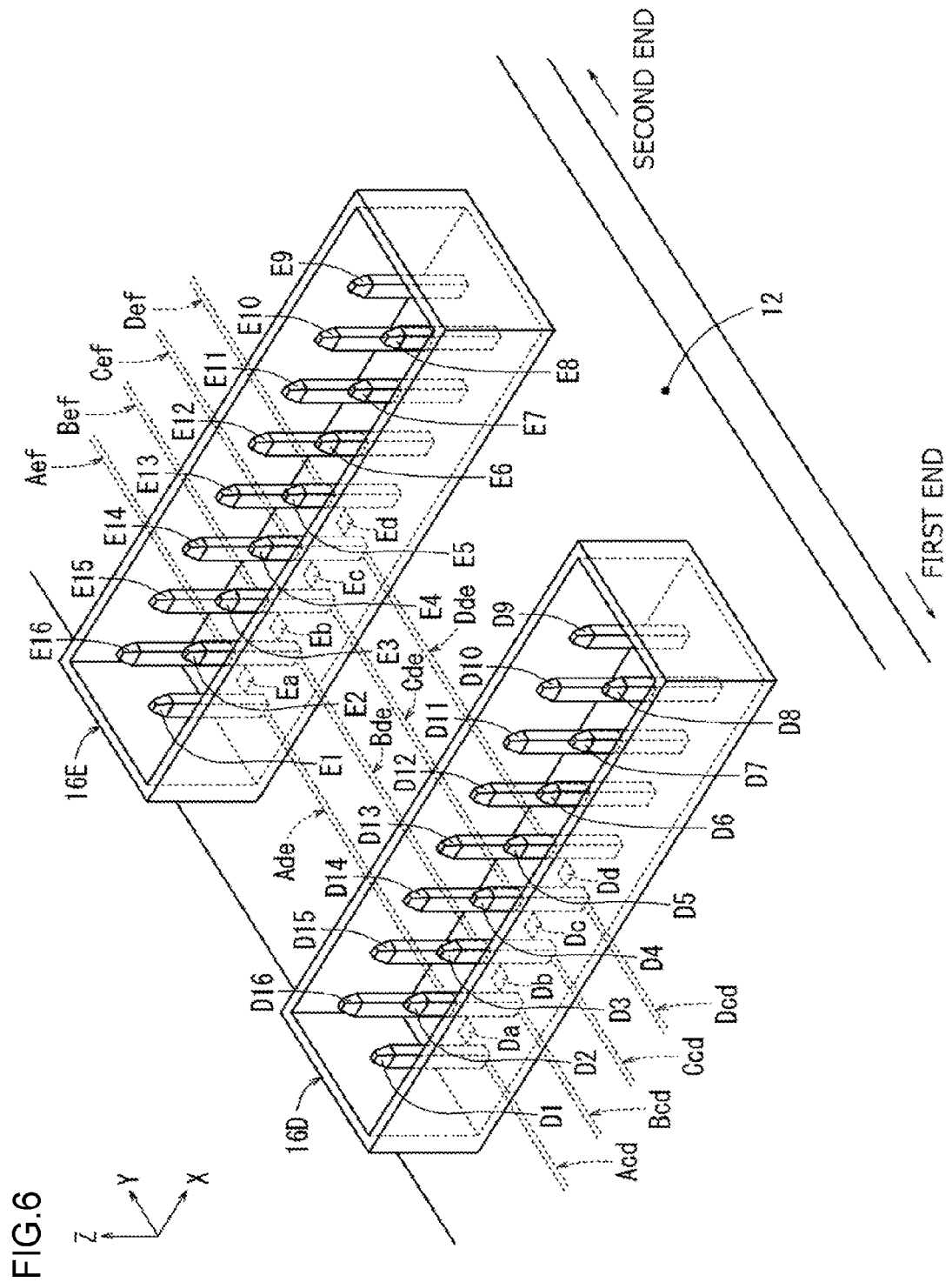
FIG. 6 is a perspective view illustrating an example of pins of slot connectors mounted on a printed circuit board, and forward communication wirings and backward communication wirings which are disposed on the printed circuit board.
Figure 7:
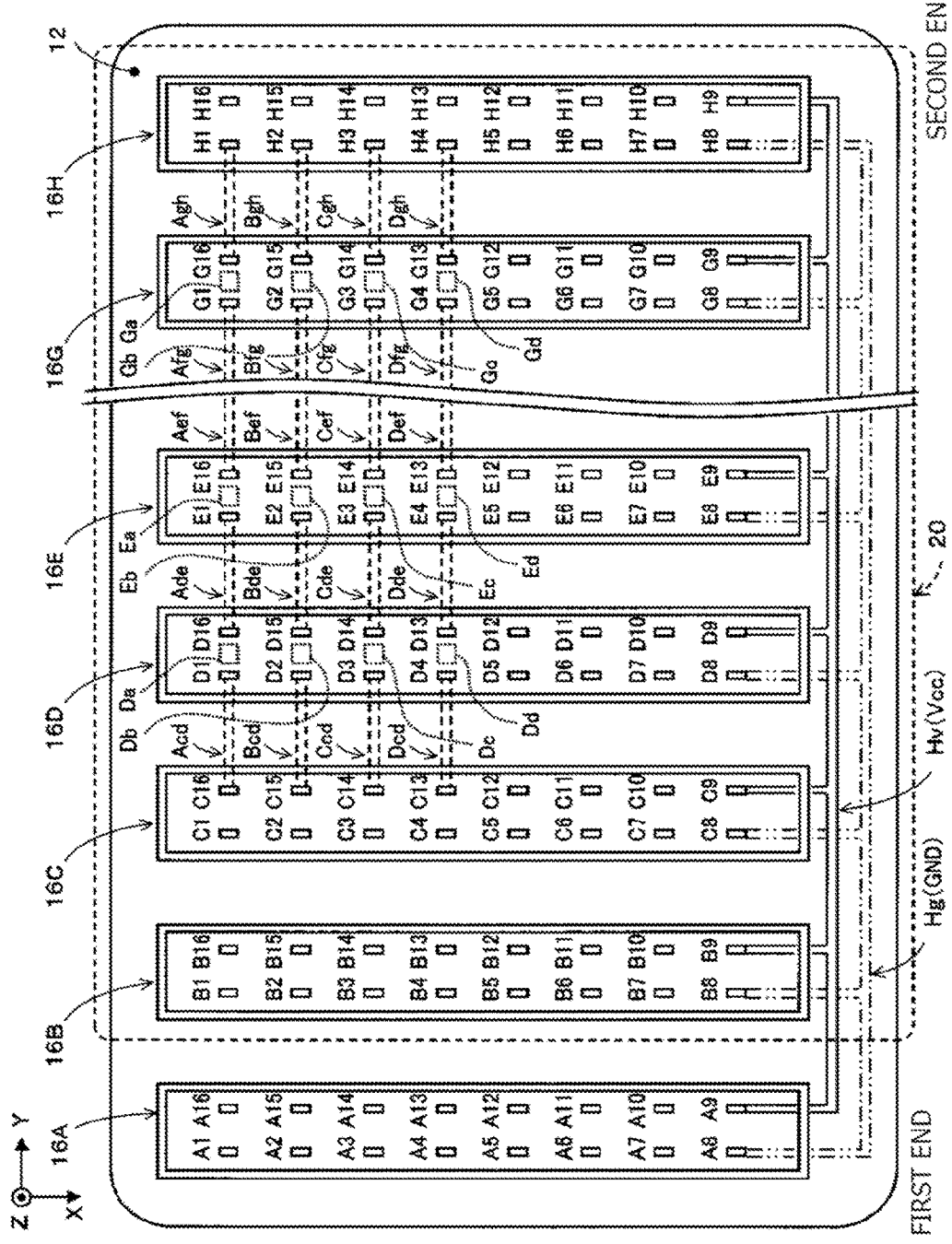
FIG. 7 is a plan view illustrating the example of the pins of slot connectors mounted on the printed circuit board, and the forward communication wirings and the backward communication wirings which are disposed on the printed circuit board.

FIGS. 6 and 7 show an example of forward communication wirings, or wirings for performing the forward communication, backward communication wirings, or wirings for performing the backward communication, and pins provided in the slot connectors. As shown in FIG. 6, each of the slot connectors 16D, 16E has a plurality of pins (D1 to D16, E1 to E16). The slot connectors are mounted on the printed circuit board 12 by connecting the pins to the printed circuit board 12 by solder etc. Among the slot connectors 16B to 16H in the communication region 20, the forward communication wirings and the backward communication wirings are disposed to extend from the slot connector closest to the second end (in this example, the slot connector 16C) out of the slot connectors where the master module is mounted to the slot connector at the second end (in this example, the slot connector 16H).

In the example shown in the present embodiment, each slot connector has 16 pins, namely first to sixteenth pins. The first to sixteenth pins are set sequentially counterclockwise from the upper left pin to the upper right pin. For example, in FIG. 7, the upper left pin of the slot connector 16D is set as the first pin D1, the lower left pin of the slot connector 16D is set as the eighth pin D8, the lower right pin of the slot connector 16D is set as the ninth pin D9, and the upper right pin of the slot connector 16D is set as the sixteenth pin D16.

In the slot connector 16D in the example of FIG. 7, the first and second pins D1, D2 serve as forward receiving pins that are used to receive information in the forward communication from the nearest module mounted on the first end side of the slot connector 16D, and the sixteenth and fifteenth pins D16, D15 serve as forward transmitting pins that are used to transmit information in the forward communication to the nearest module mounted on the second end side of the slot connector 16D. Moreover, in the slot connector 16D, the fourteenth and thirteenth pins D14, D13 serve as backward receiving pins that are used to receive information in the backward communication from the nearest module mounted on the second end side of the slot connector 16D, and the third and fourth pins D3, D4 serve as backward transmitting pins that are used to transmit information in the backward communication to the nearest module mounted on the first end side of the slot connector 16D.

Similarly, in the slot connector 16E in the example of FIG. 7, the first and second pins E1, E2 serve as forward receiving pins, the sixteenth and fifteenth pins E16, E15 serve as forward transmitting pins, the fourteenth and thirteenth pins E14, E13 serve as backward receiving pins, and the third and fourth pins E3, E4 serve as backward transmitting pins. Similarly, in the slot connector 16G, first and second pins G1, G2 serve as forward receiving pins, sixteenth and fifteenth pins G16, G15 serve as forward transmitting pins, fourteenth and thirteenth pins G14, G13 serve as backward receiving pins, and third and fourth pins G3, G4 serve as backward transmitting pins.

In the slot connector 16C (the slot connector closest to the second end out of the slot connectors where the master module is mounted) in the example of FIG. 7, sixteenth and fifteenth pins C16, C15 serve as forward transmitting pins that are used to transmit information in the forward communication to the nearest module mounted on the second end side of the slot connector 16C, and fourteenth and thirteenth pins C14, C13 serve as backward receiving pins that are used to receive information in the backward communication from the nearest module mounted on the second end side of the slot connector 16C.

In the slot connector 16H (the slot connector closest to the second end in the communication region 20) in the example of FIG. 7, first and second pins H1, H2 serve as forward receiving pins that are used to receive information in the forward communication from the nearest module mounted on the first end side of the slot connector 16H, and third and fourth pins H3, H4 serve as forward transmitting pins that are used to transmit information in the backward communication to the nearest module mounted on the first end side of the slot connector 16H.

The forward communication wirings will be described. As shown in FIG. 7, the printed circuit board 12 of the base unit 10 has forward communication wirings Acd, Bcd for the slot connectors 16C, 16D adjoining each other in the communication region 20. The forward communication wiring Acd connects the sixteenth pin C16, or the forward transmitting pin of the slot connector 16C located closer to the first end out of the slot connectors 16C, 16D, to the first pin D1, or the forward receiving pin of the slot connector 16D located closer to the second end out of the slot connectors 16C, 16D. The forward communication wiring Bcd connects the fifteenth pin C15, or the forward transmitting pin of the slot connector 16C located closer to the first end out of the slot connectors 16C, 16D, to the second pin D2, or the forward receiving pin of the slot connector 16D located closer to the second end out of the slot connectors 16C, 16D.

Similarly, the printed circuit board 12 has forward communication wirings Ade, Bde for the slot connectors 16D, 16E adjoining each other, and has forward communication wirings Agh, Bgh for the slot connectors 16G, 16H adjoining each other.

The backward communication wirings will be described. As shown in FIG. 7, the printed circuit board 12 of the base unit 10 has backward communication wirings Cgh, Dgh for the slot connectors 16H, 16G adjoining each other in the communication region 20. The backward communication wiring Cgh connects the third pin H3, or the backward transmitting pin of the slot connector 16H located closer to the second end out of the slot connectors 16H, 16G, to the fourteenth pin G14, or the backward receiving pin of the slot connector 16G located closer to the first end out of the slot connectors 16H, 16G. The backward communication wiring Dgh connects the fourth pin H4, or the backward transmitting pin of the slot connector 16H located closer to the second end out of the slot connectors 16H, 16G, to the thirteenth pin G13, or the backward receiving pin of the slot connector 16G located closer to the first end out of the slot connectors 16H, 16G.

Similarly, the printed circuit board 12 has backward communication wirings Cde, Dde for the slot connectors 16E, 16D adjoining each other, and has backward communication wirings Ccd, Dcd for the slot connectors 16D, 16C adjoining each other.

The printed circuit board 12 further has a power supply wiring Hv. For example, the power supply wiring Hv is extended from a ninth pin A9 of the slot connector 16A where the power supply module is mounted, and is connected to the ninth pins of each slot connector. Electric power (Vcc) is thus supplied from the ninth pin to the modules mounted in the slot connectors. The printed circuit board 12 further has a ground wiring Hg. For example, the ground wiring Hg is extended from an eighth pin A8 of the slot connector 16A where the power supply module is mounted, and is connected to the eighth pins of each slot connector. The potential of the eighth pin therefore serves as the reference potential (GND) of the modules mounted in the slot connectors.

Forward switching units (Da, Db, etc.) and backward switching units (Dc, Dd, etc.), described below, are disposed near each of the slot connectors (in this case, the slot connectors 16D to 16G) excluding the slot connectors of the slots where the master module is mounted (in this case, the slot connectors 16B, 16C) and the slot connector of the slot at the second end (in this case, the slot connector 16H) in the communication region 20.

The positions and connections of the forward switching units Da, Db and the backward switching units Dc, Dd will be described with reference to FIG. 8. For example, the forward switching units Da, Db and the backward switching units Dc, Dd are integrated circuits (ICs), and the same ICs are used for the forward switching units Da, Db and the backward switching units Dc, Dd.

Figure 8:
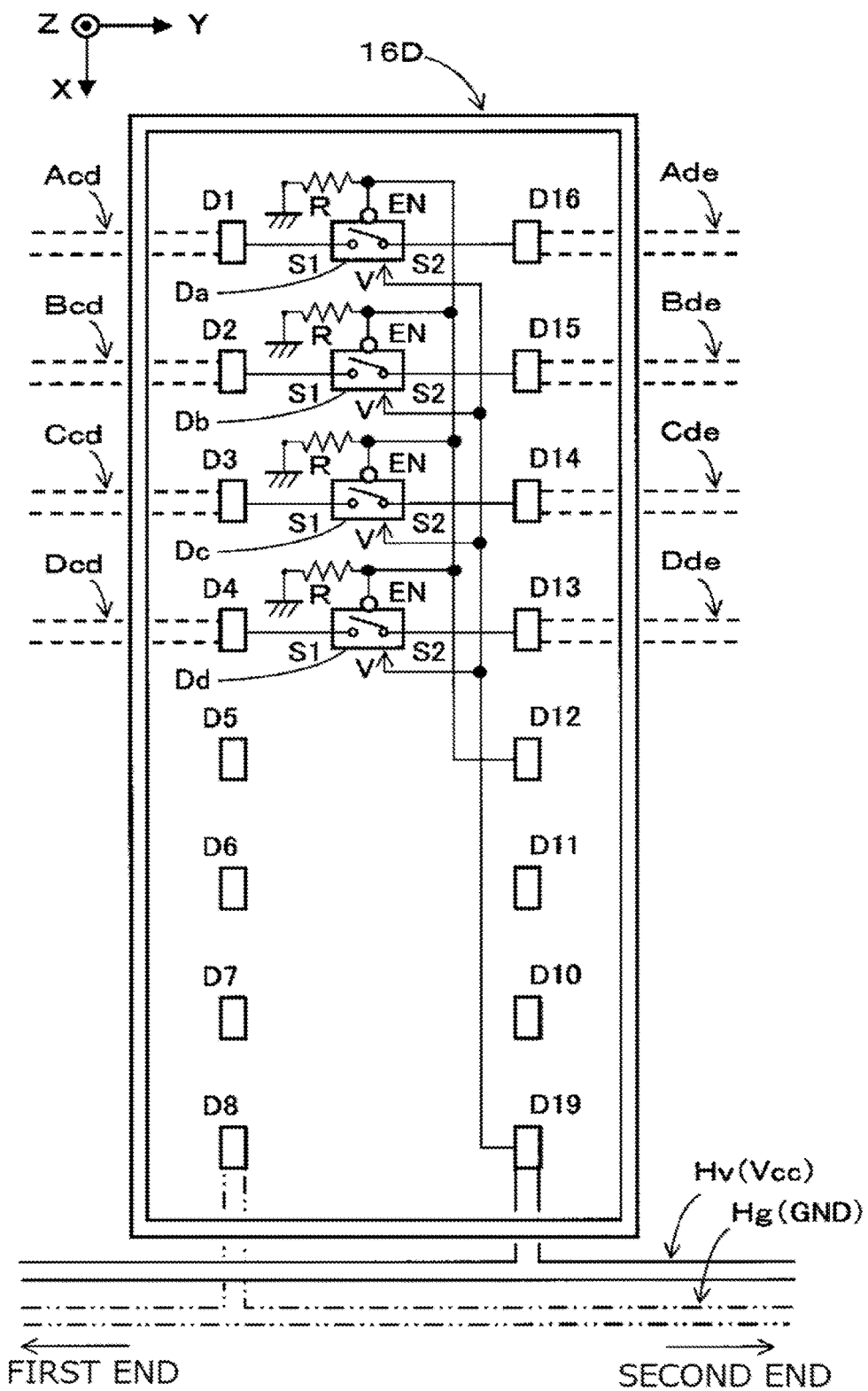
FIG. 8 is a diagram illustrating an example of the positions and connections of forward switching units and backward switching units.

As shown in FIG. 8, the forward switching units Da, Db and the backward switching units Dc, Dd are forward switch circuits and backward switch circuits which can switch between an open state and a short-circuited state. Each of the forward switching units Da, Db and the backward switching units Dc, Dd has a power supply input terminal V, input/output terminals S1, S2, and an input terminal EN. The power supply wiring Hv serving as a power source from the power supply module is connected to each power supply input terminal V. That is, electric power is supplied from the power supply wiring Hv on the printed circuit board 12 of the base unit 10 to the forward switching units Da, Db and the backward switching units Dc, Dd.

The forward switching units Da, Db and the backward switching units Dc, Dd are mounted on the opposite surface (i.e., the back surface) of the printed circuit board 12 from the slot connector 16D by solder etc. The forward switching unit Da is mounted between the first pin D1 (forward receiving pin) and the sixteenth pin D16 (forward transmitting pin), and the forward switching unit Db is mounted between the second pin D2 (forward receiving pin) and the fifteenth pin D15 (forward transmitting pin). The backward switching unit Dc is mounted between the fourteenth pin D14 (backward receiving pin) and the third pin D3 (backward transmitting pin), and the backward switching unit Dd is mounted between the thirteenth pin D13 (backward receiving pin) and the fourth pin D4 (backward transmitting pin).

Each of the forward switching units Da, Db (forward switch circuits) and the backward switching units Dc, Dd (backward switch circuits) is a switch that switches to the short-circuited state when the potential of the input terminal EN is at a low level and switches to the open state when the potential of the input terminal EN is at a high level. The input terminal EN is connected to the GND (reference potential) through a resistor R and is also connected to, e.g., the twelfth pin D12. The input/output terminal S1 of the forward switching unit Da is connected to the first pin D1 having the forward communication wiring Acd connected thereto, and the input/output terminal S2 of the forward switching unit Da is connected to the sixteenth pin D16 having the forward communication wiring Ade connected thereto. Similarly, the input/output terminal S1 of the forward switching unit Db is connected to the second pin D2 having the forward communication wiring Bcd connected thereto, and the input/output terminal S2 of the forward switching unit Db is connected to the fifteenth pin D15 having the forward communication wiring Bde connected thereto. The input/output terminal S1 of the backward switching unit Dc is connected to the third pin D3 having the backward communication wiring Ccd connected thereto, and the input/output terminal S2 of the backward switching unit Dc is connected to the fourteenth pin D14 having the backward communication wiring Cde connected thereto. Similarly, the input/output terminal S1 of the backward switching unit Dd is connected to the fourth pin D4 having the backward communication wiring Dcd connected thereto, and the input/output terminal S2 of the backward switching unit Dd is connected to the thirteenth pin D13 having the backward communication wiring Dde connected thereto.

Figure 9:
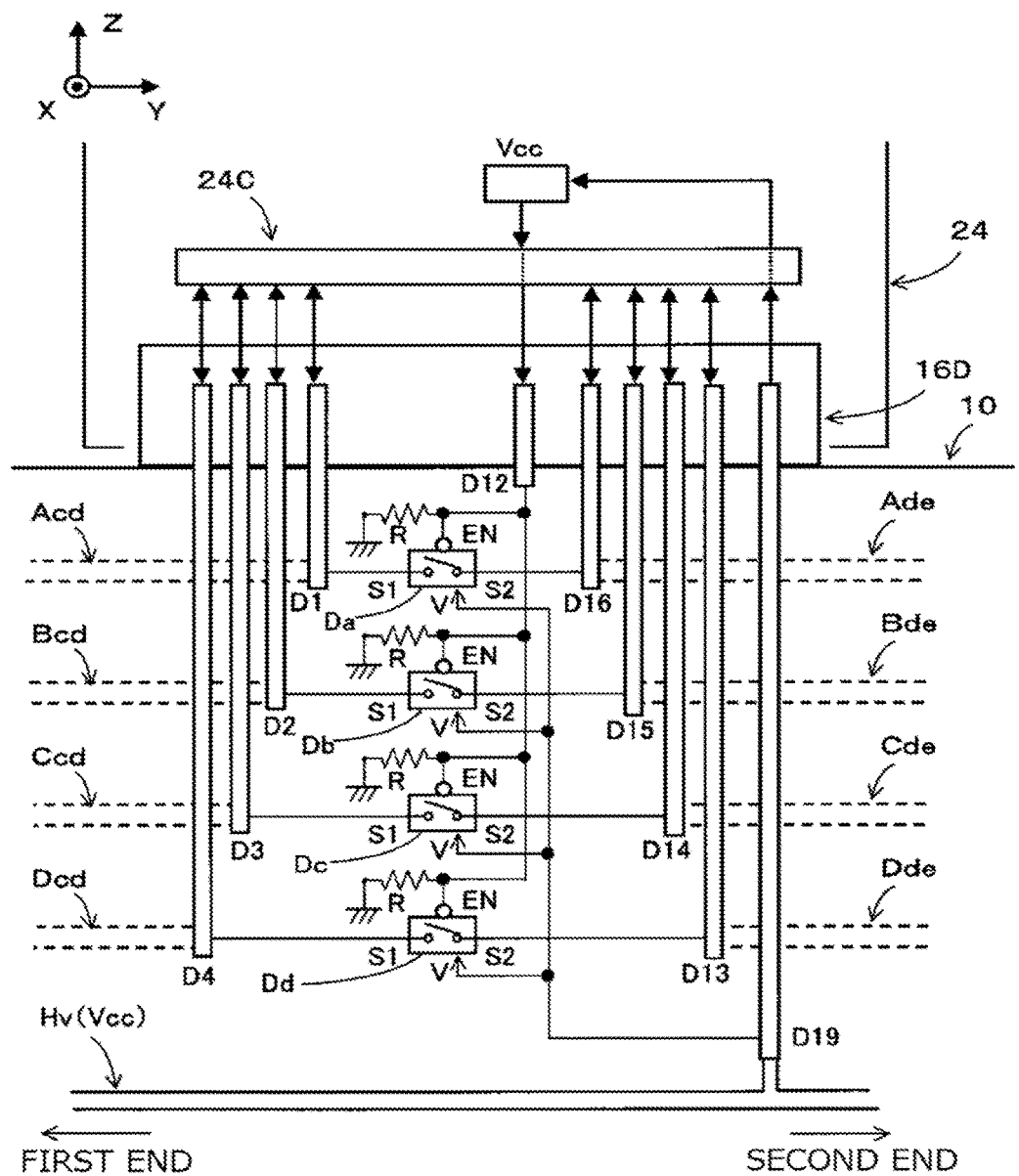
FIG. 9 is a diagram illustrating how the forward switching units and the backward switching units are switched to an open state in the case where a module is mounted in a slot.

As shown in FIG. 9, the twelfth pin D12 is a pin to which electric power (Vcc) (corresponding to the switching signal) is supplied from the module (in the example of FIG. 9, the communication module 24) if the module is mounted in the slot corresponding to the slot connector 16D. That is, in the case where the module is mounted in the slot connector, the electric power (Vcc) is applied from the twelfth pin D12 to the input terminal EN of the forward switching unit Da, so that the potential of the input terminal EN is maintained at a high level and the forward switch circuit switches to the open state. In the example of FIG. 9, since the communication module 24 is mounted in the slot corresponding to the slot connector 16D, the first pin D1 and the sixteenth pin D16 are not electrically connected to each other.

Accordingly, the communication module 24 can perform forward communication to receive information from the nearest module mounted on the first end side of the communication module 24 via the forward communication wiring Acd and the first pin D1 and to transmit the information to the nearest module mounted on the second end side of the communication module 24 via the sixteenth pin D16 and the forward communication wiring Ade.

Figure 10:
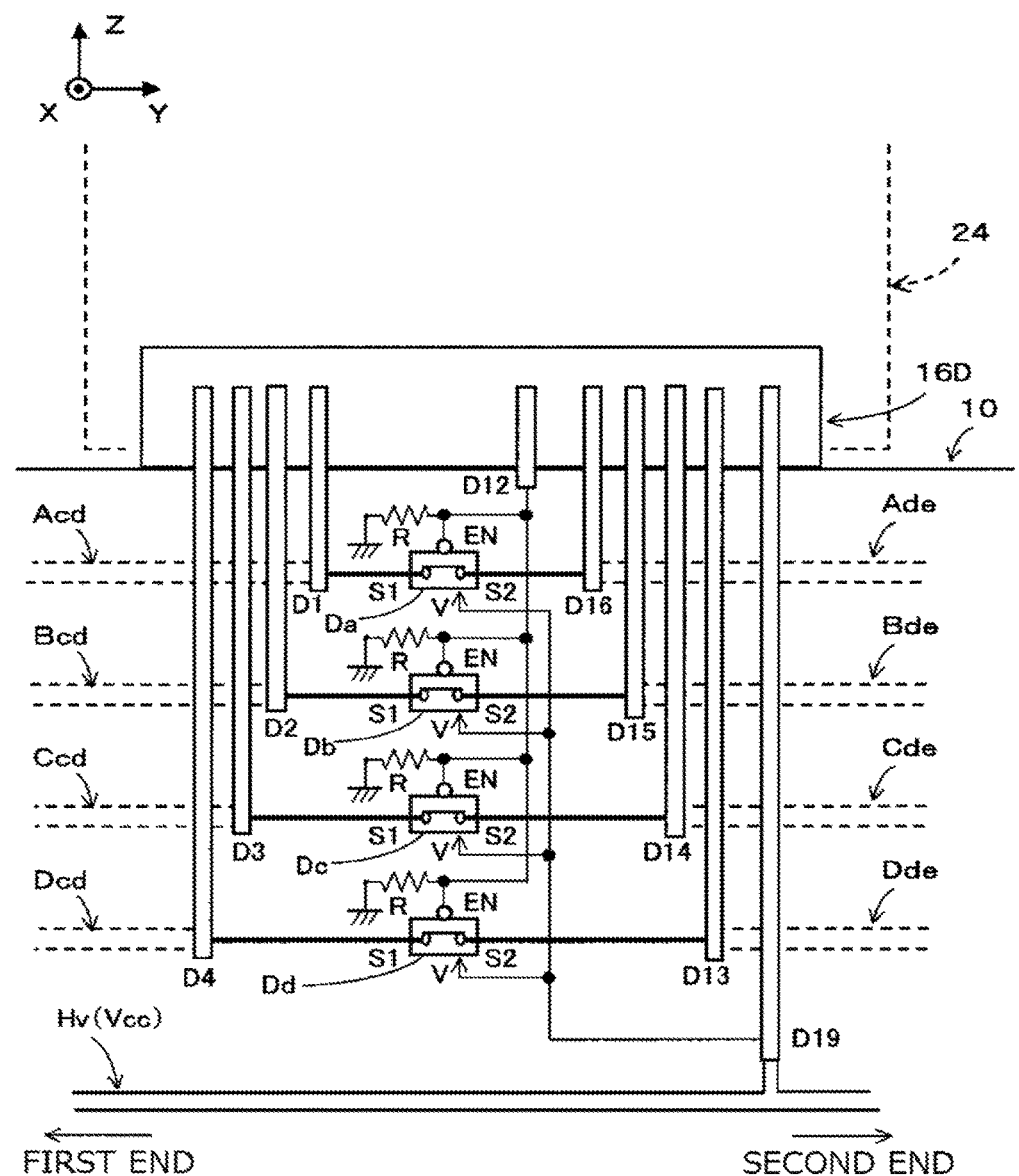
FIG. 10 is a diagram illustrating how the forward switching units and the backward switching units are switched to a short-circuited state in the case where no module is mounted in the slot.

As shown in FIG. 10, in the case where no module is mounted in the slot corresponding to the slot connector 16D, no input is applied to the twelfth pin D12. In this case, since the input terminal EN of the forward switching unit Da is merely connected to the GND (reference potential) through the resistor R, the potential of the input terminal EN is maintained at a low level and the forward switch circuit switches to the short-circuited state. In the example of FIG. 10, since no module is mounted, the first pin D1 and the sixteenth pin D16 are short-circuited. The forward communication wirings Acd, Ade are therefore short-circuited.

Regarding the forward switching unit Db as well, in the case where the module is mounted in the slot corresponding to the slot connector 16D (see FIG. 9), the second pin D2 and the fifteenth pin D15 are not electrically connected to each other. Accordingly, the communication module 24 can perform forward communication to receive information from the nearest module mounted on the first end side of the communication module 24 via the forward communication wiring Bcd and the second pin D2 and to transmit the information to the nearest module mounted on the second end side of the communication module 24 via the fifteenth pin D15 and the forward communication wiring Bde. In the case where no module is mounted in the slot corresponding to the slot connector 16D (see FIG. 10), the second pin D2 and the fifteenth pin D15 are short-circuited and the forward communication wirings Bcd, Bde are short-circuited.

Regarding the rearward switching unit Dc as well, in the case where the module is mounted in the slot corresponding to the slot connector 16D (see FIG. 9), the fourteenth pin D14 and the third pin D3 are not electrically connected to each other. Accordingly, the communication module 24 can perform backward communication to receive information from the nearest module mounted on the second end side of the communication module 24 via the backward communication wiring Cde and the fourteenth pin D14 and to transmit the information to the nearest module mounted on the first end side of the communication module 24 via the third pin D3 and the backward communication wiring Ccd. In the case where no module is mounted in the slot corresponding to the slot connector 16D (see FIG. 10), the fourteenth pin D14 and the third pin D3 are short-circuited and the backward communication wirings Cde, Ccd are short-circuited.

Regarding the rearward switching unit Dd as well, in the case where the module is mounted in the slot corresponding to the slot connector 16D (see FIG. 9), the thirteenth pin D13 and the fourth pin D4 are not electrically connected to each other. Accordingly, the communication module 24 can perform backward communication to receive information from the nearest module mounted on the second end side of the communication module 24 via the backward communication wiring Dde and the thirteenth pin D13 and to transmit the information to the nearest module mounted on the first end side of the communication module 24 via the fourth pin D4 and the backward communication wiring Dcd. In the case where no module is mounted in the slot corresponding to the slot connector 16D (see FIG. 10), the thirteenth pin D13 and the fourth pin D4 are short-circuited and the backward communication wirings Dde, Dcd are short-circuited.

FIG. 11 shows an example of a programmable controller 1 having the CPU module 22 mounted in the slots 13B, 13C, the communication module 24 mounted in the slot 13D, the input module 25 mounted in the slot 13E, and the output module 26 mounted in the slot 13F in the communication region 20. In the example of FIG. 11, the CPU module 22 (master module) is mounted in the slots closest to the first end in the communication region 20, and there is no empty slot between the modules (the modules are mounted from the first end side with no empty slot between the modules).

In this case, the forward communication is started with the communication [1-1] from the CPU module 22 to the communication module 24, and the communication [1-2] from the communication module 24 to the input module 25 and the communication [1-3] from the input module 25 to the output module 26 are performed sequentially. Information is thus sequentially transmitted from the module on the first end side to the module on the second end side among the modules mounted in the communication region 20. The output module 26 detects in the communication [1-4] that there is no module to communicate with (in the example of FIG. 11, the slot 13G is bypassed as shown in FIG. 10 as it is an empty slot), and recognizes that the output module 26 itself is the second end module. The communication [1-4] that is performed by the slave module to determine if the slave module itself is the second end module may be performed as one step of the forward communication as described above, or may be performed at an appropriate timing different from that of the forward communication. For example, the communication [1-4] may be performed only once at startup.

Figure 13:
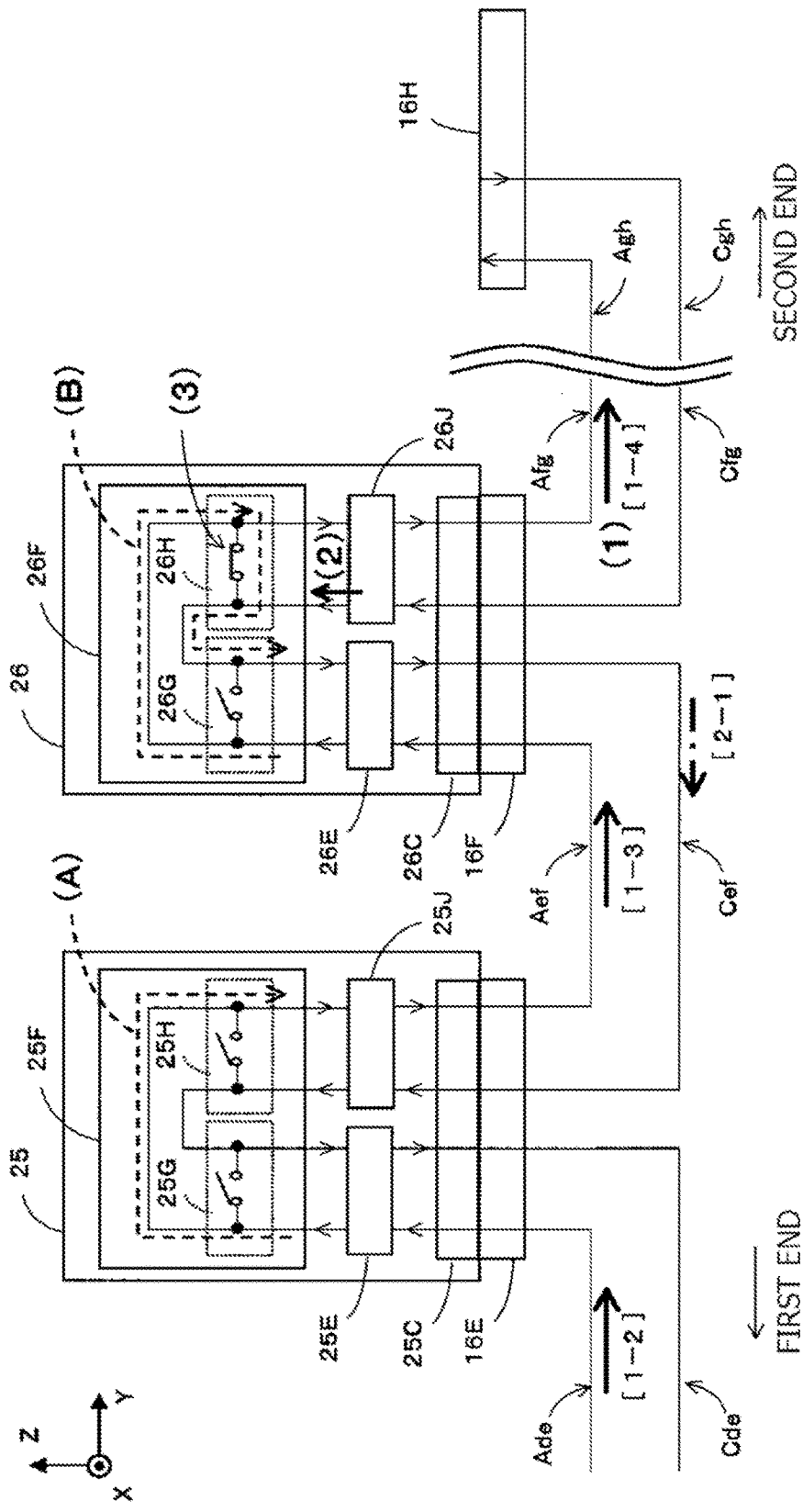
FIG. 13 is a schematic view illustrating an example of forward communication and detection of a second end module by using the internal structure of the input module, the internal structure of the output module, the forward communication wirings, and the backward communication wirings in FIG. 11.
Figure 14:
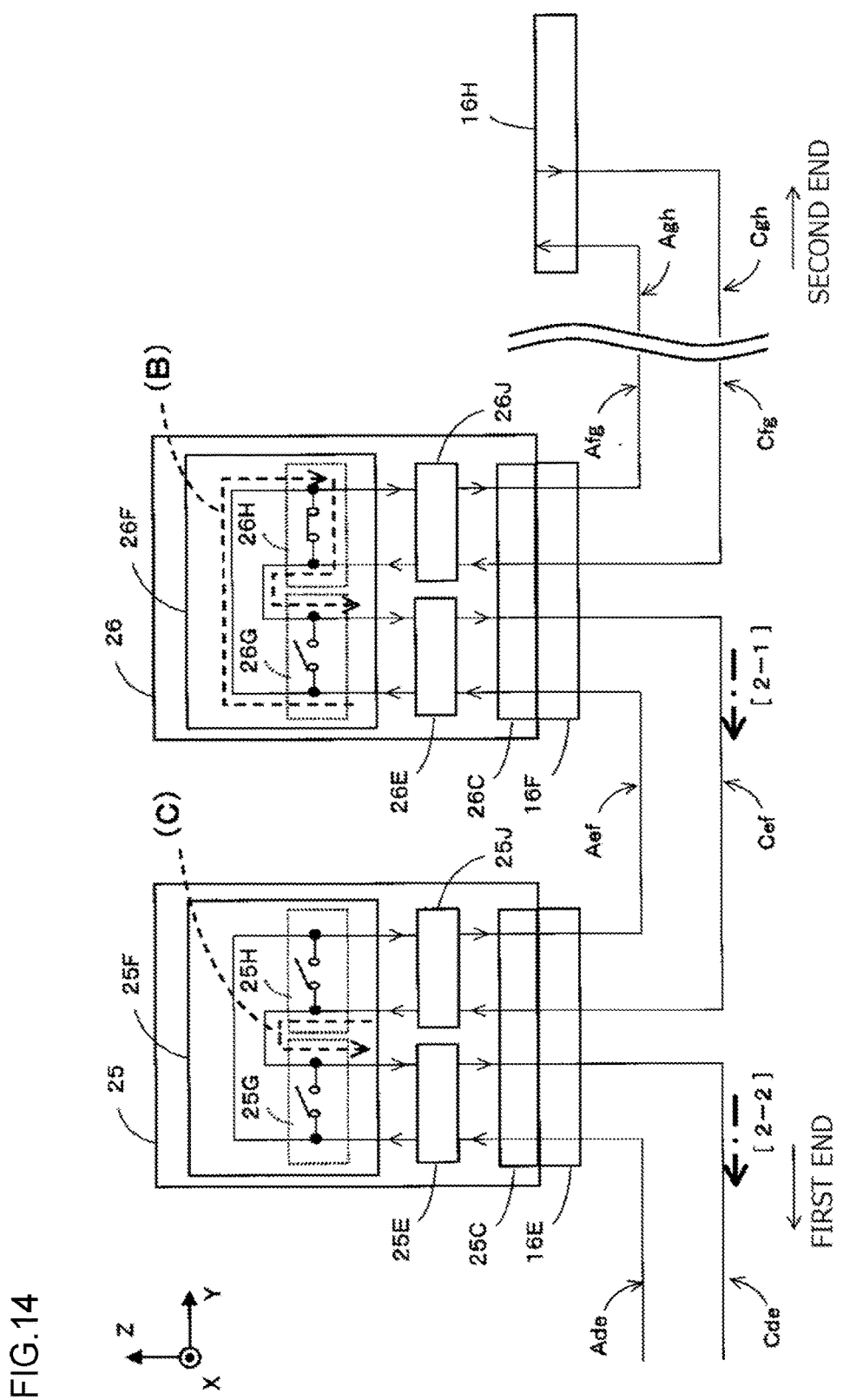
FIG. 14 is a schematic view illustrating an example of backward communication from the detected second end module by using the internal structure of the input module, the internal structure of the output module, the forward communication wirings, and the backward communication wirings in FIG. 11.
Figure 15:
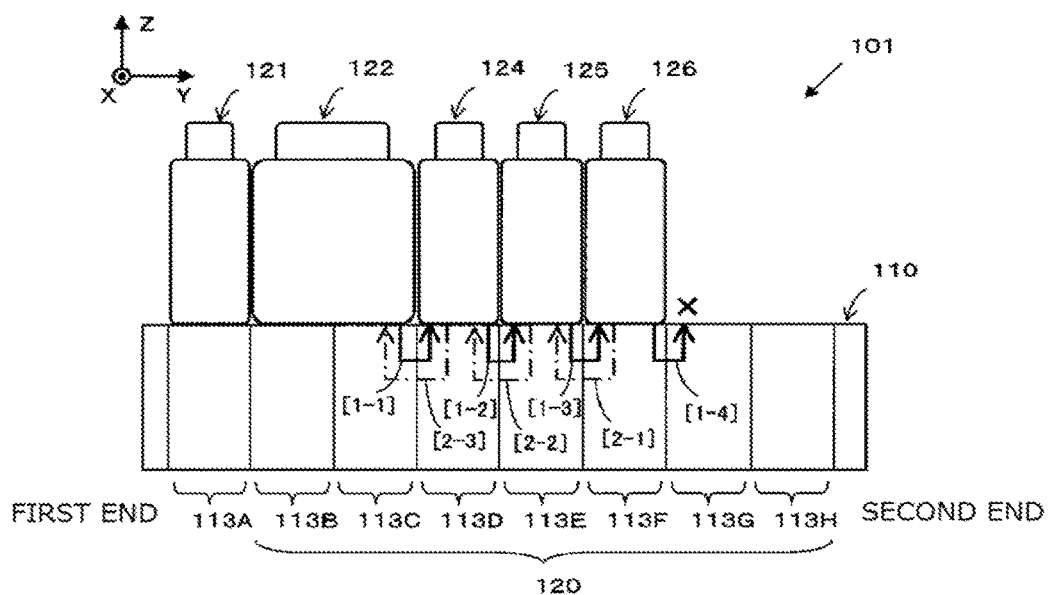
FIG. 15 is a diagram illustrating an example of forward communication and backward communication in the case where a group of mounted communication modules is formed so that there is no empty slot between adjoining ones of the modules in a conventional programmable controller.

The method for detecting the second end module will be described in detail below with reference to FIGS. 13 and 14. FIGS. 13 and 14 are schematic views of the internal structure (structure for the forward communication and the backward communication) of the input module 25 in FIG. 11, the internal structure (structure for the forward communication and the backward communication) of the output module 26 in FIG. 11, the forward communication wirings Ade, Aef, Afg, Agh, and the backward communication wirings Cgh, Cfg, Cef, Cde.

As shown in FIGS. 13 and 14, the input module 25 has the module connector 25C, physical layers 25E, 25J, a communication controller 25F (e.g., an EtherCAT controller), loopback control units 25G, 25H, etc. The physical layers 25E, 25J convert digital data that is handled by the communication controller 25F to serial data to transmit the serial data to the outside, and convert serial data received from the outside to digital data to transmit the digital data to the communication controller 25F. For example, the loopback control units 25G, 25H are switches that switch between an open state and a short-circuited state so as to be electrically disconnected from or short-circuited to the communication controller 25F. The communication controller 25F performs forward communication and backward communication via the physical layers 25E, 25J. Similarly, the output module 26 has the module connector 26C, physical layers 26E, 26J, a communication controller 26F, loopback control units 26G, 26H, etc.

As shown in FIG. 13, the communication controller 25F mounted on the input module 25 performs transmission of data for confirming (detecting) connection or the communication [1-3], or forward communication, to the module on the second end side of the input module 25 via the physical layer 25J at startup of the input module 25 having the communication controller 25F mounted thereon or when the input module 25 transmits information by forward communication. If the physical layer 25J receives a response, it transmits the response data to the communication controller 25F. If the physical layer 25J receives no response, it transmits data about no response to the communication controller 25F. If the communication controller 25F receives a response from the backward communication wiring etc. (in the case of FIG. 13, the communication controller 25F receives a response from the output module 26), it determines that the module having the communication controller 25F mounted thereon is not the second end module. If the communication controller 25F determines that the input module 25 having the communication controller 25F mounted thereon is not the second end module, the loopback control units 25G, 25H serving as switches are switched to the open state. Information received by the communication controller 25F via the physical layer 25E in the communication [1-2], or the forward communication, is thus sent to the physical layer 25J through the loopback control units 25G, 25H (see (A) in FIG. 13) and is transmitted from the physical layer 25J to the subsequent module. The communication controller 25F thus receives information through the forward communication wiring Ade, the slot connector 16E, the module connector 25C, and the physical layer 25E in the communication [1-2], or the forward communication. The communication controller 25F transmits the received information to the module on the second end side of the input module 25 (in this case, the output module 26) through the physical layer 25J, the module connector 25C, the slot connector 16E, and the forward communication wiring Aef in the communication [1-3], or the forward communication.

As shown in FIG. 13, the communication controller 26F mounted on the output module 26 performs transmission of data for confirming (detecting) connection or the communication [1-4], or forward communication, to the module on the second end side of the output module 26 via the physical layer 26J at startup of the output module 26 having the communication controller 26F mounted thereon or when the output module 26 transmits information by forward communication (see (1) in FIG. 13). If the physical layer 26J receives a response, it transmits the response data to the communication controller 26F. If the physical layer 26J receives no response, it transmits data about no response (see (2) in FIG. 13) to the communication controller 26F. If the communication controller 26F receives no response from the backward communication wiring etc. (in the case of FIG. 13, the communication controller 26F receives no response), it determines that the module having the communication controller 26F mounted thereon is the second end module. For example, if the communication controller 26F determines that the output module 26 having the communication controller 26F mounted thereon is the second end module, the loopback control unit 26G serving as a switch is switched to the open state and the loopback control unit 26H serving as a switch is switched to the short-circuited state (see (3) in FIG. 13). Information received by the communication controller 26F via the physical layer 26E in the communication [1-3], or the forward communication, is thus sent back to the physical layer 26E through the loopback control unit 26H (see (B) in FIG. 13), and the communication [2-1], or the backward communication, is performed via the physical layer 26E. The communication controller 26F thus receives information through the forward communication wiring Aef, the slot connector 16F, the module connector 26C, and the physical layer 26E in the communication [1-3], or the forward communication. The communication controller 26F transmits the received information to the module on the first end side of the output module 26 (in this case, the input module 25) through the physical layer 26E, the module connector 26C, the slot connector 16F, and the backward communication wiring Cef in the communication [2-1], or the backward communication.

FIG. 14 shows how the communication [2-2], or the backward communication, is performed by the input module 25 after the communication [2-1], or the backward communication started by the output module 26. Since the communication controller 25F mounted on the input module 25 has determined that that input module 25 having the communication controller 25F mounted thereon is not the second end module, the loopback control units 25G, 25H serving as switches have been switched to the open state. The information received by the communication controller 25F via the physical layer 25J in the communication [2-1], or the backward communication, is thus sent to the physical layer 25E through the loopback control units 25H, 25G (see (C) in FIG. 14) and is transmitted from the physical layer 25E to the subsequent module. The communication controller 25F thus receives information through the backward communication wiring Cef, the slot connector 16E, the module connector 25C, and the physical layer 25J in the communication [1-2], or the backward communication. The communication controller 25F transmits the received information to the module on the first end side of the input module 25 through the physical layer 25E, the module connector 25C, the slot connector 16E, and the backward communication wiring Cde in the communication [2-2], or the backward communication.

As described above, the output module 26 that has recognized that the output module 26 is the second end module starts the backward communication, so that the communication [2-1] from the output module 26 to the input module 25, the communication [2-2] from the input module 25 to the communication module 24, and the communication [2-3] from the communication module 24 to the CPU module 22 are sequentially performed. Information is thus sequentially transmitted from the module on the second end side to the module on the first end side among the modules mounted in the communication region 20.

Figure 16:
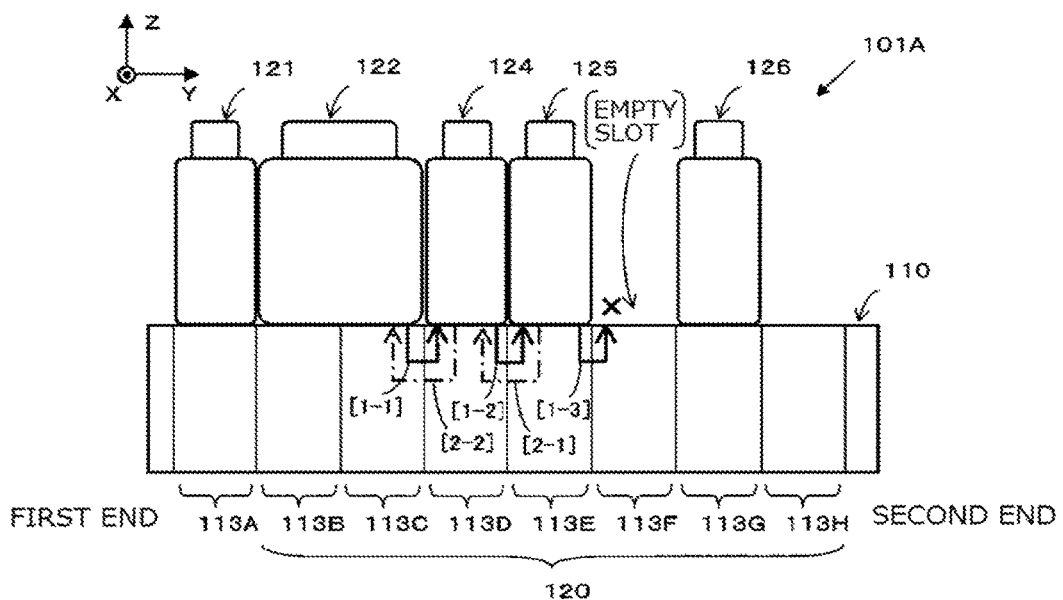
FIG. 16 is a diagram illustrating an example of forward communication and backward communication in the case where a group of mounted communication modules is formed so that there is an empty slot between adjoining ones of the modules in the conventional programmable controller.

FIG. 12 shows an example of a programmable controller 1A in which the CPU module 22 is mounted in the slots 13B, 13C, the communication module 24 is mounted in the slot 13D, the input module 25 is mounted in the slot 13E, the slot 13F is an empty slot, and the output module 26 is mounted in the slot 13G in the communication region 20. In the example of FIG. 12, the CPU module 22 (master module) is mounted in the slots closest to the first end in the communication region 20, and there is an empty slot between two of the modules (in this case, there is an empty slot between the input module 25 and the output module 26). Conventionally, as shown in FIG. 16, the output module 126 separated from the input module 125 with an empty slot therebetween performs neither forward communication nor backward communication. In the present embodiment, however, the output module 26 separated from the input module 25 with an empty slot therebetween appropriately performs both forward communication and backward communication.

In this case, the forward communication is started with the communication [1-1] from the CPU module 22 to the communication module 24, and the communication [1-2] from the communication module 24 to the input module 25 and the communication [1-3] from the input module 25 to the output module 26 are performed sequentially. The communication [1-3] is performed since the forward communication wirings are short-circuited as shown in FIG. 10 in the empty slot, namely the slot 13F. Information is thus sequentially transmitted from the module on the first end side to the module on the second end side even if there is an empty slot between any two of the modules mounted in the communication region 20. The output module 26 detects in the communication [1-4] that there is no module to communicate with, and recognizes that the output module 26 itself is the second end module.

The output module 26 that has recognized that it is the second end module starts backward communication, so that the communication [2-1] from the output module 26 to the input module 25, the communication [2-2] from the input module 25 to the communication module 24, and the communication [2-3] from the communication module 24 to the CPU module 22 are performed sequentially. The communication [2-1] is performed since the backward communication wirings are short-circuited as shown in FIG. 10 in the empty slot, namely the slot 13F. Information is thus sequentially transmitted from the module on the second end side to the module on the first end side even if there is an empty slot between any two of the modules mounted in the communication region 20.

In the programmable controllers 1, 1A described in the present embodiment, the pins of the slot connectors are selected so that the forward communication wirings Acd, Ade, Aef, Afg, Agh and the forward communication wirings Bcd, Bde, Bef, Bfg, Bgh shown in FIG. 7 are disposed linearly on the printed circuit board 12. Similarly, the pins of the slot connectors are selected so that the backward communication wirings Ccd, Cde, Cef, Cfg, Cgh and the backward communication wirings Dcd, Dde, Def, Dfg, Dgh shown in FIG. 7 are disposed linearly on the printed circuit board 12. Each of the forward switching units (Da, Db, etc.) is mounted between the forward receiving pin and the forward transmitting pin, and each of the backward switching units (Dc, Dd, etc.) is mounted between the backward receiving pin and the backward transmitting pin.

Accordingly, as shown in FIG. 7, the forward communication from the sixteenth pin C16 of the slot connector 16C has a linear path formed by the forward communication wiring Acd, the forward switching unit Da, the forward communication wiring Ade, the forward switching unit Ea, the forward communication wiring Aef, (the forward switching unit of the slot connector 16F), the forward communication wiring Afg, the forward switching unit Ga, and the forward communication wiring Agh. Similarly, the forward communication from the fifteenth pin C15 of the slot connector 16C has a linear path formed by the forward communication wiring Bcd, the forward switching unit Db, the forward communication wiring Bde, the forward switching unit Eb, the forward communication wiring Bef, (the forward switching unit of the slot connector 16F), the forward communication wiring Bfg, the forward switching unit Gb, and the forward communication wiring Bgh.

Similarly, the backward communication to the fourteenth pin C14 of the slot connector 16C has a linear path formed by the backward communication wiring Cgh, the backward switching unit Ge, the backward communication wiring Cfg, (the backward switching unit of the slot connector 16F), the backward communication wiring Cef, the backward switching unit Ec, the backward communication wiring Cde, the backward switching unit Dc, and the backward communication wiring Ccd. Similarly, the backward communication to the thirteenth pin C13 of the slot connector 16C has a linear path formed by the backward communication wiring Dgh, the backward switching unit Gd, the backward communication wiring Dfg, (the backward switching unit of the slot connector 16F), the backward communication wiring Def, the backward switching unit Ed, the backward communication wiring Dde, the backward switching unit Dd, and the backward communication wiring Dcd.

All the paths of the forward communication and the backward communication are thus linear and are substantially equal in length. In the case where the communication wiring is bent or the communication wirings disposed side by side have different lengths, signal reflection tends to occur, which tends to cause noise. In the programmable controller of the present embodiment, however, each of the switch circuits (the forward switching units and the backward switching units) that can cause bending of the communication wirings is disposed on the opposite surface of the printed circuit board (and between the pins). This makes it easy to form the linear communication wirings. The influence of noise etc. can therefore be avoided, and more reliable forward communication and backward communication can be achieved.

The programmable controllers 1, 1A of the present invention are not limited to the structure, configuration, appearance, shape, etc. described in the present embodiment, and various modifications, additions, and deletions can be made. For example, the number of slots of the base unit, the types of modules, etc. are not limited to those described in the present embodiment.

Although the present embodiment is described with respect to a programmable controller having two forward communication wirings and two backward communication wirings, the present invention is also applicable to a programmable controller having a single forward communication wiring and a single backward communication wiring.

In the present embodiment, EtherCAT communication is described as an example of communication using forward communication and backward communication. However, the present invention is not limited to EtherCAT communication and is also applicable to various programmable controllers using communication having forward communication and backward communication.

What is claimed is:

1. A programmable controller, comprising:
a base unit having a plurality of slots, or spaces where modules are to be mounted, arranged from a first end to a second end; and
the modules mounted in the slots; wherein
a slot connector that fits in a module connector of the module is provided in each of the slots, and the module is mounted in the slot by fitting the module connector on the slot connector,
the modules include a master module that includes a function to start communication from the master module to another one of the modules at predetermined timing, and a slave module that includes a function to receive information through communication and perform communication to another one of the modules,
the master module is mounted in one or more of the slots including the slot closest to the first end in a communication region, or a region including a plurality of the slots where the modules that perform the communication are to be mounted,
the slave module is mounted in at least one of a plurality of the slots which are located closer to the second end than the one or more slots where the master module is mounted in the communication region,
the communication includes forward communication that is started by the master module and that is performed so that the information is sequentially transmitted from the module on a first end side to the module on a second end side, and backward communication that is started by a second end module, or the slave module mounted closest to the second end, after the second end module receives the information in the forward communication, and that is performed so that the information is sequentially transmitted from the second end module to the master module,
when the slave module mounted closest to the second end attempts to transmit the information received from the module on the first end side in the forward communication to the module on the second end side in the forward communication, this slave module detects that there is no module mounted on the second end side of this slave module, and recognizes that this slave module itself is the second end module,
the base unit has forward communication wirings each connecting the slot connector on the first end side to the slot connector on the second end side out of the slot connectors adjoining each other in the communication region and performing the forward communication, and backward communication wirings each connecting the slot connector on the second end side to the slot connector on the first end side out of the slot connectors adjoining each other in the communication region and performing the backward communication, a forward switching unit and a backward switching unit are disposed near each of the slot connectors of intermediate slots, or the slots in the communication region excluding the one or more slots where the master module is mounted and the slot at the second end, the forward switching unit electrically disconnects the forward communication wiring on the first end side from the forward communication wiring on the second end side when the module is mounted in the slot, and electrically short-circuits the forward communication wiring on the first end side to the forward communication wiring on the second end side when the module is not mounted in the slot, and the backward switching unit electrically disconnects the backward communication wiring on the second end side from the backward communication wiring on the first end side when the module is mounted in the slot, and electrically short-circuits the backward communication wiring on the second end side to the backward communication wiring on the first end side when the module is not mounted in the slot.

2. The programmable controller according to claim 1, wherein each of the slot connectors of the intermediate slots has a plurality of pins and has a forward receiving pin that is used for communication with the nearest module mounted on the first end side of that slot connector in the forward communication, a forward transmitting pin that is used for communication with the nearest module mounted on the second end side of that slot connector in the forward communication, a backward receiving pin that is used for communication with the nearest module mounted on the second end side of that slot connector in the backward communication, and a backward transmitting pin that is used for communication with the nearest module mounted on the first end side of that slot connector in the backward communication, the slot connector of the slot located closest to the second end out of the slots where the master module is mounted in the communication region has a plurality of pins and has the forward transmitting pin and the backward receiving pin, the slot connector of the slot at the second end in the communication region has a plurality of pins and has the forward receiving pin and the backward transmitting pin, the forward communication wiring on the first end side is connected to the forward receiving pin, the forward communication wiring on the second end side is connected to the forward transmitting pin, the backward communication wiring on the second end side is connected to the backward receiving pin, the backward communication wiring on the first end side is connected to the backward transmitting pin, the forward switching unit is connected to the forward receiving pin and the forward transmitting pin, and the forward switching unit electrically disconnects the forward receiving pin from the forward transmitting pin if the module is mounted in the slot, and electrically short-circuits the forward receiving pin to the forward transmitting pin if the module is not mounted in the slot, and the backward switching unit is connected to the backward receiving pin and the backward transmitting pin, and the backward switching unit electrically disconnects the backward receiving pin from the backward transmitting pin if the module is mounted in the slot, and electrically short-circuits the backward receiving pin to the backward transmitting pin if the module is not mounted in the slot.

3. The programmable controller according to claim 1, wherein the forward switching unit is a forward switch circuit that can switch between an open state and a short-circuited state, the backward switching unit is a backward switch circuit that can switch between an open state and a short-circuited state, electric power is supplied from the base unit to the forward switch circuit and the backward switch circuit, if the module is mounted in the slot corresponding to the forward switch circuit and the backward switch circuit, a switch signal is applied from this module to the forward switch circuit and the backward switch circuit, if the module is not mounted in the slot corresponding to the forward switch circuit and the backward switch circuit, the switch signal is not applied to the forward switch circuit and the backward switch circuit, the forward switch circuit and the backward switch circuit electrically disconnect intended ones of the wirings or the pins from each other if the switch signal is applied thereto, and the forward switch circuit and the backward switch circuit electrically short-circuit the intended ones of the wirings or the pins to each other if the switch signal is not applied thereto.

4. The programmable controller according to claim 3, wherein the forward switch circuits, the backward switch circuits, and the slot connectors are mounted on a printed circuit board disposed on the base unit, each of the forward communication wirings and the backward communication wirings is linearly disposed on the printed circuit board, each of the forward switch circuits is mounted on an opposite surface of the printed circuit board from the slot connector so as to be located between the forward communication wiring on the first end side and the forward communication wiring on the second end side, and each of the backward switch circuits is mounted on the opposite surface of the printed circuit board from the slot connector so as to be located between the backward communication wiring on the second end side and the backward communication wiring on the first end side.

* * * * *